US012578705B2

(12) United States Patent
Wang et al.

(10) Patent No.: US 12,578,705 B2
(45) Date of Patent: Mar. 17, 2026

(54) METHOD FOR DYNAMIC SCALE MODEL SATISFYING HYDRODYNAMIC FORCE SIMILARITY AND BENDING ELASTIC FORCE SIMILARITY

(71) Applicant: Tianjin University, Tianjin (CN)

(72) Inventors: Zhongxing Wang, Tianjin (CN); Qinghua Han, Tianjin (CN); Mengyu Li, Tianjin (CN); Yanhui Zuo (CN); Lele Zhan, Tianjin (CN)

(73) Assignee: Tianjin University, Tianjin (CN)

( * ) Notice: Subject to any disclaimer, the term of this patent is extended or adjusted under 35 U.S.C. 154(b) by 1 day.

(21) Appl. No.: 19/012,780

(22) Filed: Jan. 7, 2025

(65) Prior Publication Data

US 2025/0251713 A1      Aug. 7, 2025

(30) Foreign Application Priority Data

Feb. 6, 2024    (CN) .......................... 202410168552.7

(51) Int. Cl.
*G05B 19/4099*          (2006.01)
(52) U.S. Cl.
CPC .................... *G05B 19/4099* (2013.01); *G05B 2219/49023* (2013.01)
(58) Field of Classification Search
CPC .................. G05B 19/4099; G05B 2219/49023
USPC ........................................................ 700/118
See application file for complete search history.

(56) References Cited

FOREIGN PATENT DOCUMENTS

| CN | 112162081 A | * | 1/2021 | ............ | G01M 10/00 |
| CN | 113947044 A | | 1/2022 | | |
| CN | 115455556 A | | 12/2022 | | |
| CN | 116337403 A | | 6/2023 | | |
| CN | 117386568 A | | 1/2024 | | |

OTHER PUBLICATIONS

Y. Ding, et. al., "Underwater shaking table tests on bridge pier under combined earthquake and wave-current action", Marine Structures 58 (2018) 301-320 (Year: 2018).*

(Continued)

*Primary Examiner* — Thomas C Lee
*Assistant Examiner* — Michael Tang

(57)          ABSTRACT

Disclosed is a design method for a dynamic scale model satisfying hydrodynamic force similarity and bending elastic force similarity in the technical field of civil engineering. The design and fabrication method includes the following steps: step 1, designing a scale model satisfying structural dynamic similarity under pure seismic effects: designing a scale model A with a structural density scale $S_\rho$ of 1 using a bending elastic force-gravity similarity law; step 2, adjusting, based on the scale model A designed in step 1, a width of a water-facing surface and a width of a flow direction surface of the scale model according to a principle that a hydrodynamic force scale is consistent with an inertial force scale and the bending elastic force-gravity similarity law, to obtain a scale model B; step 3, fabricating the scale model B obtained in step 2 using 3D printing technology.

3 Claims, 4 Drawing Sheets

(56)               References Cited

OTHER PUBLICATIONS

Q. Han, et. al., "Strategy of scaled modelling for underwater shaking table tests on cylindrical marine structures under coupled earthquake and wave-current action: A review", Earthquake Engineering and Resilience: vol. 2, Issue 3, Sep. 2023 pp. 263-281 (Year: 2023).*

Q. Han, et. al., "Evaluation on the applicability of similitude laws for scaled model design in underwater shaking table tests in the elastic stage", Applied Ocean Research 153 (2024) 104252 (Year: 2024).*

* cited by examiner

METHOD FOR DYNAMIC SCALE MODEL SATISFYING HYDRODYNAMIC FORCE SIMILARITY AND BENDING ELASTIC FORCE SIMILARITY

CROSS-REFERENCE TO RELATED APPLICATION

This application claims priority of Chinese Patent Application No. 202410168552.7, filed on Feb. 6, 2024, the entire contents of which are incorporated herein by reference.

TECHNICAL FIELD

The present disclosure relates to the technical field of civil engineering, and in particular to a design method for a dynamic scale model satisfying hydrodynamic force similarity and bending elastic force similarity.

BACKGROUND

With the development of economy and society, an increasing number of major marine structures have been constructed, such as offshore wind power structures, cross-sea bridges, and subsea tunnels, with the offshore wind power structures being crucial in the sustainable energy development strategy, and the cross-sea bridges and subsea tunnels serving as key transportation hubs. Given that offshore wind power support structures, piers of cross-sea bridges, and subsea tunnels share similar structural forms and load-bearing characteristics, they are collectively referred to as columnar marine structures, which are the most common and widespread form of marine structures. Most of the columnar marine structures that have been completed or are under construction are located in earthquake-prone areas, where they are often subjected to the effects of earthquakes, waves, and currents, as well as the combined effects thereof during construction and service. Existing seismic damage investigations indicate that the combined effect of earthquakes, waves, and currents is one of the key causes of damage to columnar marine structures. However, it is very challenging to reveal the stress and failure mechanisms of the structure under such complex loading conditions. At present, underwater shaking table model tests are one of the most important and accurate methods for investigating the stress mechanisms of these structures under the combined effects of earthquakes, waves, and currents. The obtained model test results provide critical support for the service safety and seismic design of major marine structures worldwide. However, the accuracy of model test results for predicting the response of the engineering prototype is affected by the selected dynamic similarity law. A model designed with accurate and reasonable similarity laws can provide accurate predictions for the response of engineering prototype. Conversely, the significance of model test will be limited.

The conventional dynamic test similarity laws include the elastic force similarity law, gravity similarity law, and elastic force-gravity similarity law. These laws only consider the dynamic response similarity of the structure under earthquake loading, without clarifying the interaction mechanisms between the water and the structure. They also simply require the structural density scale to be equal to the water density scale to ensure hydrodynamic force similarity. However, the density of water is virtually unchanged, whereas the density of the model structure often needs to be adjusted. The inconsistency in the density scale between the two leads to hydrodynamic force dissimilarity between the model and the prototype structure. To address the issue of hydrodynamic force dissimilarity, some researchers have proposed using the Morison equation and wave diffraction theory to adjust the amplitude of the hydrodynamic forces in model tests where the structural density scale is not equal to 1, thereby achieving hydrodynamic force similarity. However, recent studies have shown that models designed using this method have significant distortion in their sectional dimensions and require heavy model counterweight, which leads to difficulties in model design and fabrication. Furthermore, the proposed method is based on the combined effects of earthquakes and waves, only considering the hydrodynamic force similarity induced by earthquake and wave forces. It takes into account that the presence of currents not only increases the current force but also affects the wave force due to nonlinear interactions between waves and currents. Therefore, it is difficult to apply this method to the design of underwater shaking table model tests under the combined effects of earthquakes, waves, and currents.

To ensure hydrodynamic force similarity and structure similarity, the scale model for underwater shaking table tests often requires adjustments to the sectional shape, resulting in high complexity. Additionally, the small dimension of the scale model demands high machining precision. Existing scale model structures designed based on similarity laws often require the density of the model material to be greater than that of the prototype material. As a result, steel is one of the most commonly used materials for scale model fabrication. However, conventional steel structures are typically assembled by welding or bolting members formed through machining or casting, which is costly, and has a problem of difficulty in machining when the members have complex geometries. Therefore, the conventional steel structure manufacturing methods make it difficult to achieve precise machining of scale models.

In conclusion, to design and fabricate a test model that can accurately predict the response of the prototype and ensure the validity of the underwater shaking table test, it is necessary to propose a method that addresses the challenges of conventional similarity laws, such as the inability to simultaneously satisfy structure similarity and hydrodynamic force similarity, significant sectional distortion, high counterweights, and the difficulty of accurately fabricating complex models using the conventional process.

SUMMARY

To address the above-mentioned issues, an objective of the present disclosure is to provide a design method for a dynamic scale model satisfying hydrodynamic force similarity and bending elastic force similarity. This method is applicable to the design and fabrication of an underwater shaking table scale model for columnar marine structures under combined effects of earthquakes, waves, and currents. The model designed using this method can accurately predict the dynamic response of the prototype structure under pure seismic conditions, hydrostatic seismic conditions, and combined effects of earthquakes, waves, and currents.

To achieve the above objective, a design method for a dynamic scale model satisfying hydrodynamic force similarity and bending elastic force similarity includes the following steps:

step 1, designing a scale model satisfying structural dynamic similarity under pure seismic effects: according to a columnar marine structure prototype, designing a scale model A with a structural density scale $S_\rho$ of 1 using a bending elastic force-gravity similarity law;

step 2, based on the scale model A designed in step 1, adjusting a width of a water-facing surface and a width of a flow direction surface of the scale model according to a principle that a hydrodynamic force scale is consistent with an inertial force scale and the bending elastic force-gravity similarity law, to obtain a scale model B satisfying hydrodynamic force similarity and bending elastic force-gravity similarity law; and step 3, fabricating the scale model B obtained in step 2 using 3D printing technology.

Further, in step 1, on the premise that a restoring force is mainly considered to be a bending restoring force, an equation of the bending elastic force-gravity similarity law is as follows:

$$S_k S_l = S_m S_a, \tag{1}$$

where $S_k$ is a structural bending stiffness scale, namely, a ratio of a model stiffness $k_m$ to a prototype stiffness $k_p$; $S_l$ is a structural geometric dimension scale; $S_m$ is a structural mass scale; and $S_a$ is an acceleration scale;

to ensure that response of the designed scale model and the prototype are similar in elastic and elastic-plastic phases, the designed scale model and the prototype are made of a same material, namely, the structural density scale $S_\rho$ is 1; according to $S_m = S_\rho S_V$, the structural mass scale $S_m$ in equation 1 is replaced by a structural volume scale $S_V$, and design of the scale model A satisfies gravity similarity law, namely, $S_a$ is 1, then equation 2 is obtained from equation 1:

$$S_k S_l = S_V. \tag{2}$$

Further, in step 1, a process of designing the scale model A using the bending elastic force-gravity similarity law is as follows:

determining a length scale $S_l$ of the columnar marine structure scale model according to a dimension and load limitation of an underwater shaking table, and designing the scale model A according to the calculation equations for the stiffness and volume of the columnar marine structure prototype and model.

Further, a process of determining a length scale $S_l$ of the columnar marine structure scale model according to a dimension and load limitation of an underwater shaking table is as follows: taking a value of $S_l$ being equal to a ratio of a maximum dimension at which shaking table surface can hold the scale model to an actual structural dimension of the columnar marine structure prototype; and calculating whether a total mass of the scale model exceeds the load limitation of the shaking table according to the taken value of $S_l$, where if the load limitation is not exceeded, the value is taken as the geometric scale for structural design for subsequent design; and if the load limitation is exceeded, the value of $S_l$ is further reduced until the total mass of the scale model is less than the load limitation of the shaking table; and using the value of $S_l$ at this time for subsequent design.

Further, a process of designing the scale model A according to the calculation equations for the stiffness and volume of the columnar marine structure prototype and model is as follows:

substituting the calculation equations for the structural stiffness and volume of the columnar marine structure prototype and model into Equation 2 to obtain a thickness scale $S_t$, specifically, traversing a scale $S_D$ of an outer diameter of the scale model structure from 0 to $S_l$, obtaining a corresponding $S_t$ value according to each $S_D$ value, and selecting a group of $S_D$ values and $S_t$ values with low processing difficulty and high processing efficiency to design the scale model A.

Further, in step 2, an equation of the bending elastic force-gravity similarity law satisfying hydrodynamic force similarity is as follows:

$$S_{F,D} = S_k S_l = S_V, \tag{3}$$

$$S_{F,a} = S_k S_l = S_V, \tag{4}$$

where $S_{F,D}$ is a drag force scale in hydrodynamic force; $S_{F,a}$ is an inertial force scale in hydrodynamic force; equation 3 is based on the premise that the drag force $F_D$ predominates in hydrodynamic force, and equation 4 is based on the premise that an inertial force $F_a$ predominates in hydrodynamic force.

Further, a process of designing the scale model B from the bending elastic force-gravity similarity law satisfying hydrodynamic force similarity is as follows:

determining dimensions of the water-facing surface and the flow direction surface of section of the scale model A according to the principle that the hydrodynamic force scale is consistent with the inertial force scale and the bending elastic force-gravity similarity law, specifically, calculating the hydrodynamic force scale of the prototype and model structure using Morison equation, and calculating the stiffness scale $S_k$ and the structural volume scale $S_V$ using the equations for stiffness and volume of the columnar marine structure prototype and model, obtaining a width scale $S_b$ of the flow direction surface and a width scale $S_w$ of the water-facing surface according to relationships between scales of each physical quantity in Equation 3 or 4;

if the obtained width scale $S_b$ of the flow direction surface and the width scale $S_w$ of the water-facing surface are difficult to achieve in engineering, it is necessary to consider changing the thickness scale $S_t$ to obtain reasonable $S_b$ and $S_w$; a method for changing the thickness $S_t$ is traversing values of $S_t$ from 0 to $S_l$ to obtain corresponding $S_b$ and $S_w$, and selecting a group of $S_w$, $S_t$, and $S_b$ which are easy to be implemented in engineering to design the scale model B.

Further, in step 3, an applicable additive manufacturing technology is selected according to the complexity and precision requirements for designing the model. For model structures with complex shapes and high manufacturing precision requirements, selective laser melting (SLM) technology is employed, which can manufacture complex metal components with a high degree of freedom, produce nearly 100% high-density parts, and achieve dimensional precision of 20 to 50 µm. For model structures with simple shapes and lower manufacturing precision requirements, wire arc additive manufacturing (WAAM) technology is selected, offering high production efficiency and low cost, with a dimensional precision of approximately +0.7 mm.

Compared with the prior art, the present disclosure has the following beneficial effects:

(1) In the present disclosure, it relaxes the stringent requirements for scale model design to some extent, still allowing the model and prototype to be made of the same materials in large-scale model design, thereby ensuring that the structural responses of both the model and the prototype are similar in the elastic and elastic-plastic phases.

(2) In the present disclosure, it enables the design of a large-scale model satisfying structure similarity and hydrodynamic force similarity, using a smaller degree of sectional distortion and lower model mass, while ensuring the consistency of the water density scale to structural density scale. The model designed according to this similarity law does not require additional counterweights, thus avoiding the existing issue of uneven distribution of counterweights in underwater shaking table scale model tests, for example, in the case of a model under hydrostatic seismic conditions with $S_l=1/50$, the total mass of the model designed using the existing similarity law is approximately 125,000 times that of the model designed by similarity law proposed in the present disclosure, with the sectional distortion degree ($S_w/S_l$) being about 1.14 times.

(3) The model designed by the present disclosure can accurately predict the dynamic response of the prototype under pure seismic conditions, hydrostatic seismic conditions, and combined effects of earthquakes, waves, and currents. Moreover, the prediction results under hydrostatic seismic conditions and combined effects of earthquakes, waves, and currents are superior to those of models designed using existing similarity laws.

(4) The present disclosure is applicable to various columnar marine structures, and the hydrodynamic force similarity conditions can be adjusted based on the different load-bearing characteristics of the structures (whether dominated by drag force or inertial force).

(5) The scale model is simple, efficient, and accurate in fabrication, allowing underwater shaking table scale tests to be conducted without being constrained by model fabrication technology.

DETAILED DESCRIPTION

Figure 1:
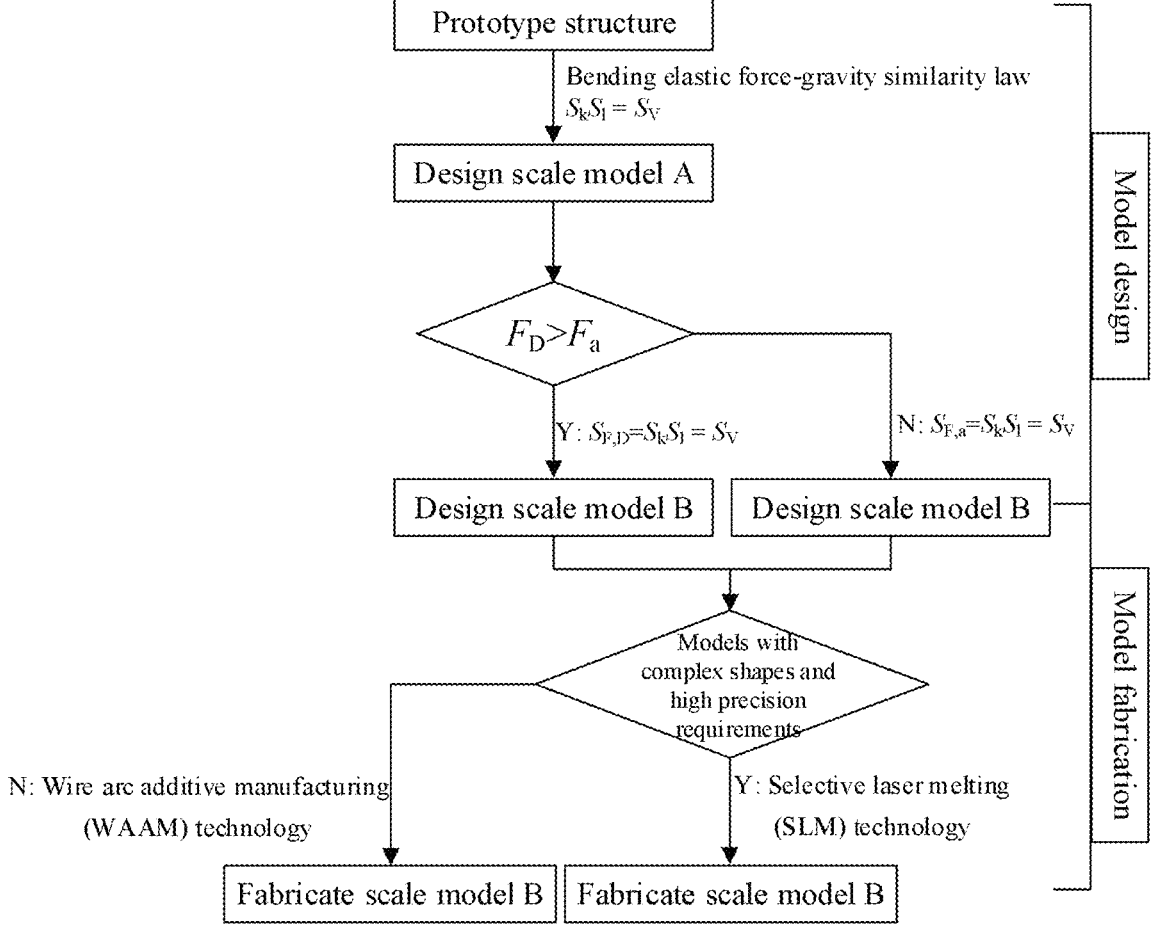
FIG. 1 is a flow chart of a design method for a dynamic scale model satisfying hydrodynamic force similarity and bending elastic force similarity according to an embodiment of the present disclosure.

To make the objective, technical solutions, and advantages of the present disclosure clearer, a more detailed description of the technical solutions of the embodiments of the present disclosure will be provided with reference to the drawings. Throughout the drawings, the same or similar reference numerals indicate the same or similar elements or elements with the same or similar function. The described embodiments are only some rather than all embodiments of the present disclosure.

All other embodiments obtained by those ordinarily skilled in the art based on the embodiment in the present disclosure without creative efforts shall fall within the scope of protection of the present disclosure.

The embodiments and directional expressions described below with reference to the drawings are exemplary and are intended to be illustrative of the present disclosure and are not to be construed as limiting the present disclosure.

In one broad embodiment of the present disclosure, a design method for a dynamic scale model satisfying hydrodynamic force similarity and bending elastic force similarity includes the following steps.

Step 1, a scale model satisfying structural dynamic similarity under pure seismic effects is designed: according to a columnar marine structure prototype, a scale model A with a structural density scale $S_\rho$ of 1 is designed using a bending elastic force-gravity similarity law.

Step 2, based on the scale model A designed in step 1, a width of a water-facing surface and a width of a flow direction surface of the scale model are adjusted according to a principle that a hydrodynamic force scale is consistent with an inertial force scale and the bending elastic force-gravity similarity law, to obtain a scale model B satisfying hydrodynamic force similarity and bending elastic force-gravity similarity law.

Step 3, the scale model B obtained in step 2 is fabricated using 3D printing technology.

Further, in step 1, on the premise that a restoring force is mainly considered to be a bending restoring force, an equation of the bending elastic force-gravity similarity law is as follows:

$$S_k S_l = S_m S_a, \qquad (1)$$

where $S_k$ is a structural bending stiffness scale, namely, a ratio of a model stiffness $k_m$ to a prototype stiffness $k_p$; $S_l$ is a structural geometric dimension scale; $S_m$ is a structural mass scale; and $S_a$ is an acceleration scale.

To ensure that response of the designed scale model and the prototype are similar in elastic and elastic-plastic phases, the designed scale model and the prototype are made of a same material, namely, the structural density scale $S_\rho$ is 1; according to $S_m=S_\rho S_V$, the structural mass scale $S_m$ in equation 1 is replaced by a structural volume scale $S_V$, and design of the scale model A satisfies gravity similarity law, namely, $S_a$ is 1, then equation 2 is obtained from equation 1:

$$S_k S_l = S_V. \qquad (2)$$

Further, in step 1, a process of designing the scale model A using the bending elastic force-gravity similarity law is as follows.

A length scale $S_l$ of the columnar marine structure scale model is determined according to a dimension and load limitation of an underwater shaking table, and the scale model A is designed according to the calculation equations for the stiffness and volume of the columnar marine structure prototype and model.

Further, a process of determining a length scale $S_l$ of the columnar marine structure scale model according to a dimension and load limitation of an underwater shaking table is as follows. A value of $S_l$ being equal to a ratio of a maximum dimension at which shaking table surface can hold the scale model to an actual structural dimension of the columnar marine structure prototype is taken; and whether a total mass of the scale model exceeds the load limitation of the shaking table is calculated according to the taken value of $S_l$. If the load limitation is not exceeded, the value is taken as the geometric scale for structural design for subsequent design; and if the load limitation is exceeded, the value of $S_l$ is further reduced until the total mass of the scale model is less than the load limitation of the shaking table. The value of $S_l$ at this time is used for subsequent design.

Further, a process of designing the scale model A according to the calculation equations for the stiffness and volume of the columnar marine structure prototype and model is as follows.

The calculation equations for the structural stiffness and volume of the columnar marine structure prototype and model are substituted into Equation 2 to obtain a thickness scale $S_t$. Specifically, a scale $S_D$ of an outer diameter of the scale model structure is traversed from 0 to $S_l$, a corresponding $S_t$ value is obtained according to each $S_D$ value, and a group of $S_D$ values and $S_t$ values with low processing difficulty and high processing efficiency are selected to design the scale model A.

Further, in step 2, an equation of the bending elastic force-gravity similarity law satisfying hydrodynamic force similarity is as follows:

$$S_{F,D} = S_k S_l = S_V, \qquad (3)$$

$$S_{F,a} = S_k S_l = S_V, \qquad (4)$$

where $S_{F,D}$ is a drag force scale in hydrodynamic force; $S_{F,a}$ is an inertial force scale in hydrodynamic force; equation 3 is based on the premise that the drag force $F_D$ predominates in hydrodynamic force, and equation 4 is based on the premise that an inertial force $F_a$ predominates in hydrodynamic force.

Further, a process of designing the scale model B from the bending elastic force-gravity similarity law satisfying hydrodynamic force similarity is as follows.

Dimensions of the water-facing surface and the flow direction surface of section of the scale model A are determined according to the principle that the hydrodynamic force scale is consistent with the inertial force scale and the bending elastic force-gravity similarity law. Specifically, the hydrodynamic force scale of the prototype and model structure is calculated using Morison equation, and the stiffness scale $S_k$ and the structural volume scale $S_V$ are calculated using the equations for stiffness and volume of the columnar marine structure prototype and model, a width scale $S_b$ of the flow direction surface and a width scale $S_w$ of the water-facing surface are obtained according to relationships between scales of each physical quantity in Equation 3 or 4.

If the obtained width scale $S_b$ of the flow direction surface and the width scale $S_w$ of the water-facing surface are difficult to achieve in engineering, it is necessary to consider changing the thickness scale $S_t$ to obtain reasonable $S_b$ and $S_w$; a method for changing the thickness $S_t$ is traversing values of $S_t$ from 0 to $S_l$ to obtain corresponding $S_b$ and $S_w$, and selecting a group of $S_w$, $S_t$, and $S_b$ which are easy to be implemented in engineering to design the scale model B.

Further, in step 3, an applicable additive manufacturing technology is selected according to the complexity and precision requirements for designing the model; for model structures with complex shapes and high manufacturing precision requirements, SLM technology is employed; and for model structures with simple shapes and lower manufacturing precision requirements, WAAM technology is selected, offering high production efficiency and low cost.

The embodiments of the present disclosure are described below in detail, in conjunction with the drawings, for a more thorough explanation of the present disclosure.

Figure 2:
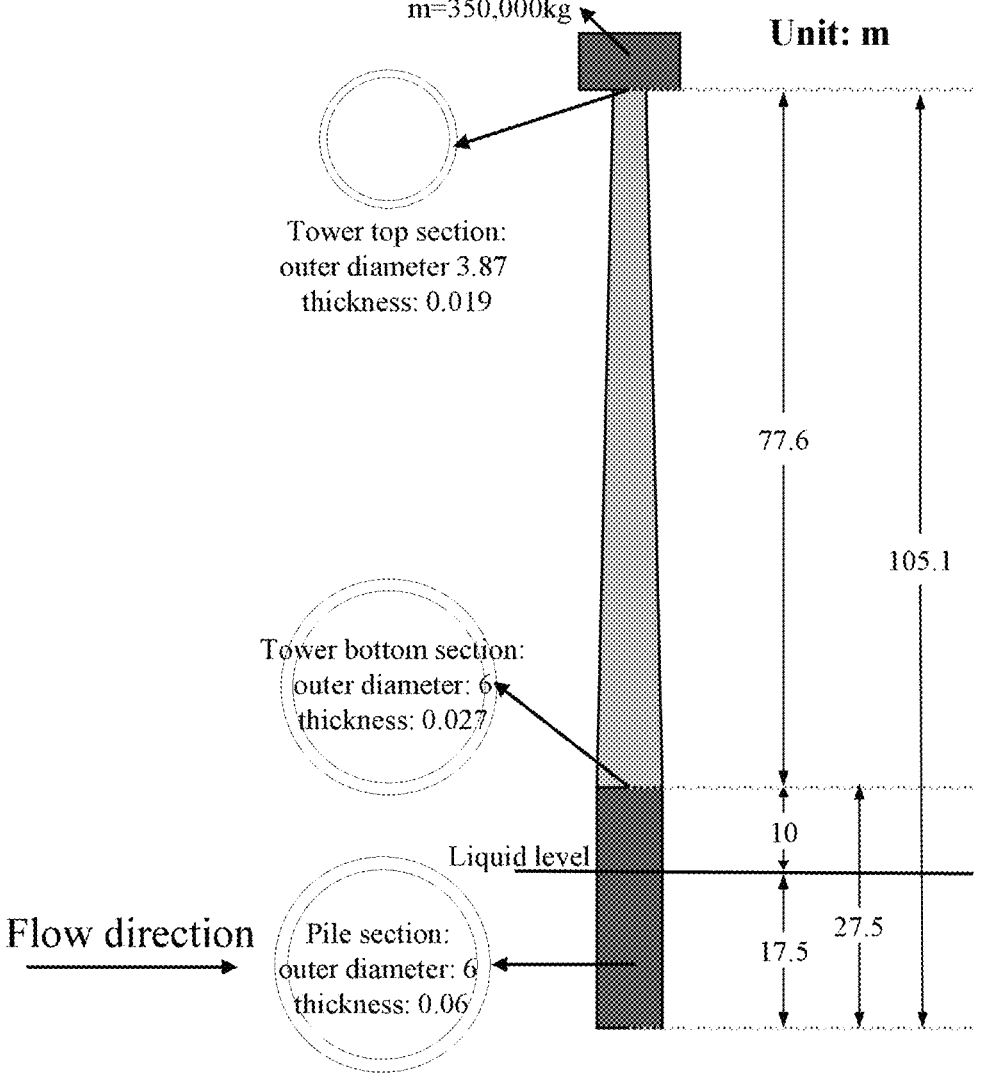
FIG. 2 is a diagram of a wind turbine prototype according to an embodiment of the present disclosure.
Figure 3:
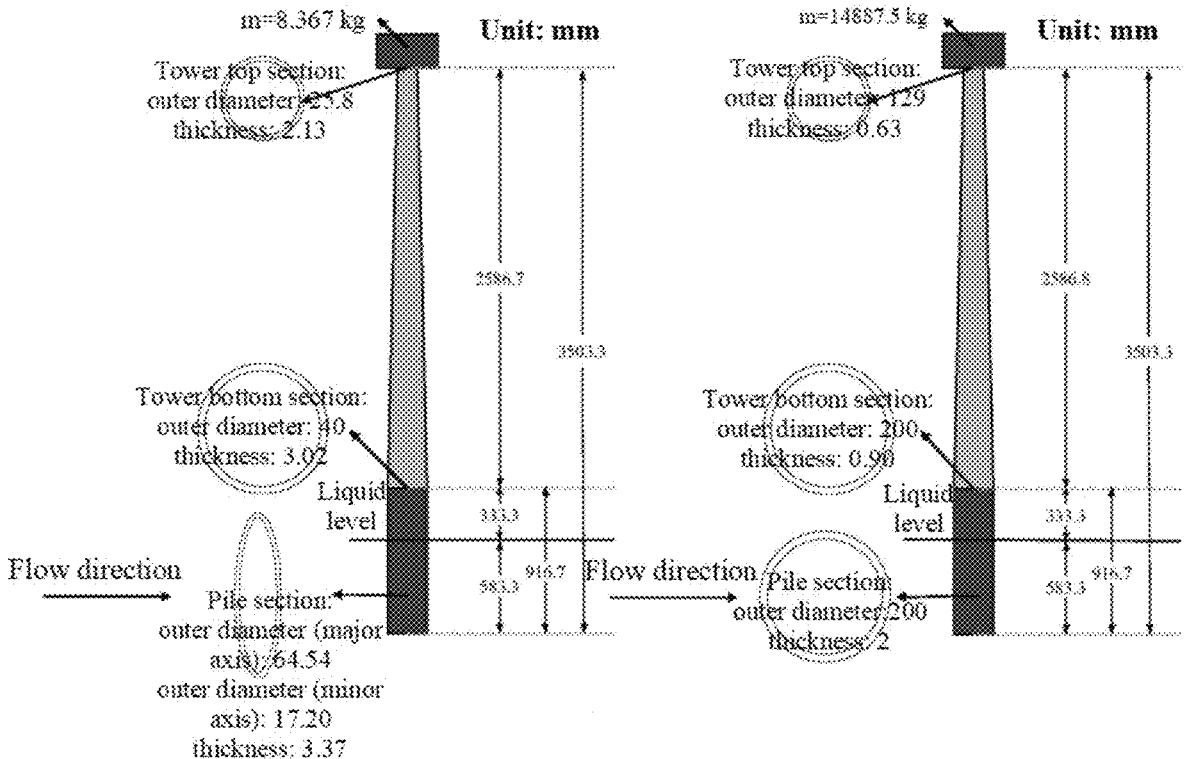
FIG. 3 is a diagram of a wind turbine model according to an embodiment of the present disclosure.

In this embodiment, the prototype structure is a 5 MW wind turbine from the National Renewable Energy Laboratory of the U.S. The sectional shape and structural dimensions are detailed in FIG. 2. The material used is steel, which is subjected to the combined effects of earthquake (El-Centro (0.2 g)), wave (wave height 3 m, period 7 s), and current (current velocity 3 m/s). The additional mass on the upper part of the wind turbine is 350,000 kg. Considering a geometric dimension scale of 1/30, model 1 (using this method) and model 2 (using the conventional method) are designed based on the prototype structure adopting different similarity laws. The shape and dimensions of the scale models are shown in FIG. 3. Since the structure of model 1 is complex and it is difficult to achieve an accurate model using conventional manufacturing methods, SLM technology is used for model fabrication, while model 2 is produced using conventional techniques. To ensure the similarity of the response between the model and the prototype in the elastic and elastic-plastic phases, the model and the prototype are made of the same materials. The similarity constants of the scale model are shown in Table 1.

In this embodiment, the specific steps for designing and manufacturing an underwater shaking table scale model of a single-pile offshore wind power structure using the method of the present disclosure are as follows.

At step 1, for the full-scale prototype structure of the single-pile offshore wind power structure, the scale model A is designed according to the bending elastic force-gravity similarity law, with the design Equation 2.

Specifically, the design method for the scale model A using the bending elastic force-gravity similarity law is as follows.

Given the length scale and outer diameter scale of the scale model of the single-pile offshore wind power structure, the structural stiffness Equation 6 and the volume Equation 5 are substituted into Equation 2 to obtain the thickness scale $S_t$, and then the scale model A in step 1 is obtained. It is to be noted that the selection of the outer diameter scale interacts with the calculated thickness scale, and a plurality of iterations may be required to obtain a reasonable thickness scale and outer diameter scale:

$$V = \int_0^L \frac{\pi}{4}(D^2 - (D - 2t)^2)dL, \qquad (5)$$

$$k = 1/\int_0^L \frac{\overline{M} \cdot \overline{M}}{EI}dL, \qquad (6)$$

where L is the structural height; D is the structural outer diameter; t is the structural thickness; $\overline{M}$ is the bending moment caused by virtual unit load at the apex; E is the modulus of elasticity; and I is the inertia moment of the section.

At step 2, for the scale model A designed in step 1, considering the similarity of drag force, the tower portion of the wind power structure remains unchanged and the shape of the pile in the model is adjusted from circular to elliptical in accordance with the requirement of hydrodynamic force similarity, resulting in scale model B. The adjustment Equation 3 is provided.

Specifically, the design method for the scale model B in step 2 using a bending elastic force-gravity similarity law satisfying hydrodynamic force similarity is as follows.

The shape of the pile in the scale model is changed from step 1 to an elliptical shape, with the wall thickness remaining unchanged and the section shape of the tower portion remaining unchanged. A major axis and a minor axis of the elliptical pile are determined according to the bending elastic force-gravity similarity law equation satisfying the hydrodynamic force similarity, to obtain the scale model B in step 2.

At step 3, since the wind turbine model has a variable section and requires high dimensional precision, it is fabricated using SLM technology. This process involves a high-energy laser beam moving rapidly to precisely scan and melt the metal powder layer by layer, repeating until all layers of the model are completed. The surface of the model is then cleaned of un-melted metal powder using a brush or air gun. Finally, heat treatment is performed to eliminate internal stresses generated during printing, followed by finishing to achieve the required surface roughness and precision.

prototype response by 3%, while the prediction result from model 2, designed using the conventional method, is 122.3 mm, which differs from the prototype response by 18%. Therefore, the scale model designed using the method of the present disclosure under combined effects of earthquakes, waves, and currents can predict the response of the prototype structure more accurately than the scale model designed using the conventional method.

Finally, it is to be noted that the above embodiments are provided for illustrating the technical solution of the present disclosure and are not intended to limit the scope of the present disclosure. Although the present disclosure has been described in detail with reference to the foregoing embodiments, the ordinarily skilled in the art is to understand that it is still possible to make modifications to the technical solutions documented in the foregoing embodiments or to make equivalent substitutions for some of the technical features therein; and such modifications or substitutions do not make the essence of the corresponding technical solutions deviate from the spirit and the scope of the technical solutions of the various embodiments of the present disclosure.

TABLE 1

Similarity relationship between physical quantity of model and prototype structure

| Physical quantity | Similarity relationship | Similarity constant | |
| --- | --- | --- | --- |
| | | Model 1 (the present disclosure) | Model 2 (the conventional method) |
| Geometric dimension l | $S_l$ | 1/30 | 1/30 |
| Displacement x | $S_x$ | 1/30 | 1/30 |
| Stiffness k | $S_k$ | 1/1548 | 1/30 |
| Strain ε | $S_\epsilon$ | 1 | 1 |
| Modulus of elasticity E | $S_E$ | 1 | 1 |
| Stress σ | $S_\sigma$ | 1 | 1 |
| Density ρ | $S_\rho$ | 1 | 30 |
| Velocity v | $S_v$ | $1/\sqrt{30}$ | $1/\sqrt{30}$ |
| Time t | $S_t$ | $1/\sqrt{30}$ | $1/\sqrt{30}$ |
| Acceleration a | $S_a$ | 1 | 1 |
| Mass m | $S_m$ | 1/41831 | 1/900 |
| Wave height H | $S_H$ | 1/30 | 1/30 |
| Water depth h | $S_h$ | 1/30 | 1/30 |
| Period T | $S_T$ | $1/\sqrt{30}$ | $1/\sqrt{30}$ |
| Wavelength λ | $S_\lambda$ | 1/30 | 1/30 |
| Current velocity u | $S_u$ | $1/\sqrt{30}$ | $1/\sqrt{30}$ |

Figure 4:
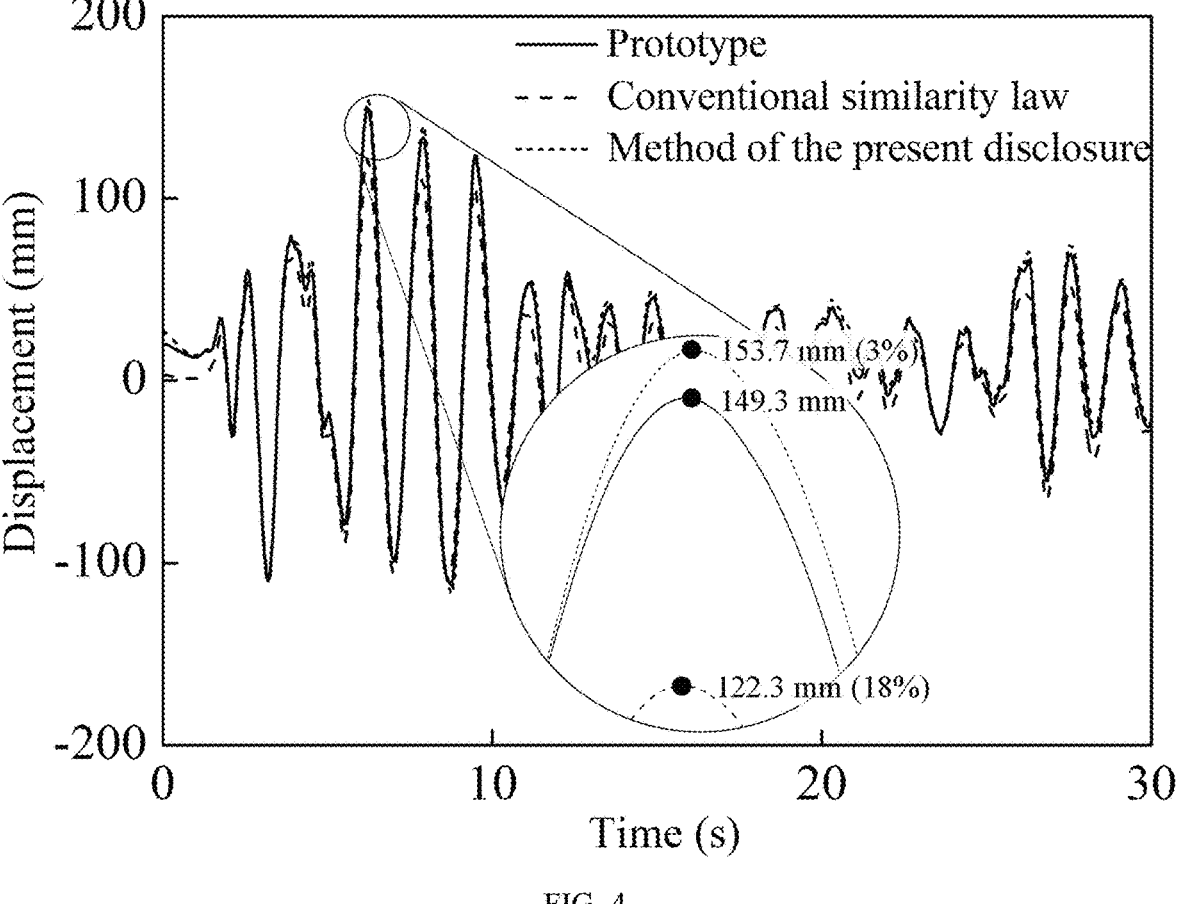
FIG. 4 is a comparison chart of a prototype response predicted by design model 1 based on a method of the present disclosure, a prototype response predicted by design model 2 based on a conventional similarity law, and a prototype response obtained through direct calculation.

The wind turbine prototype, model 1 designed using the method of the present disclosure, and model 2 designed using the conventional method are each established using numerical methods. The top displacement response results of each model are extracted, and the calculated results of model 1 and model 2 are back-calculated using the similarity constants shown in Table 1 to obtain the predicted prototype response. These predicted prototype responses are then compared with the prototype response obtained through direct calculation. The comparison results are shown in FIG. 4. As shown in the drawing, the trends of the top displacement responses predicted by models 1 and 2, designed using the method of the present disclosure and the conventional method, respectively, are consistent with the prototype analysis results. However, for the top displacement peak value, which is of practical interest in engineering, the prototype calculation result is 149.3 mm. The prediction result from model 1, designed using the method of the present disclosure, is 153.7 mm, which differs from the

The invention claimed is:

1. A design method for a dynamic scale model satisfying hydrodynamic force similarity and bending elastic force similarity, comprising the following steps:

step 1, designing a scale model satisfying structural dynamic similarity under pure seismic effects: designing, according to a columnar marine structure prototype, a scale model A with a structural density scale $S_\rho$ of 1 using a bending elastic force-gravity similarity law, step 2, adjusting, based on the scale model A designed in step 1, a width of a water-facing surface and a width of a flow direction surface of the scale model according to a principle that a hydrodynamic force scale is consistent with an inertial force scale and the bending elastic force-gravity similarity law, to obtain a scale model B satisfying hydrodynamic force similarity and bending elastic force-gravity similarity law, and step 3, fabricating the scale model B obtained in step 2 using 3D printing technology, wherein in step 1, on the premise that a restoring force is considered to be a bending restoring force, an equation of the bending elastic force-gravity similarity law is as follows:

$$S_k S_l = S_m S_a, \tag{1}$$

where $S_k$ is a structural bending stiffness scale that is a ratio of a model stiffness $k_m$ to a prototype stiffness $k_p$; $S_l$ is a structural geometric dimension scale; $S_m$ is a structural mass scale; and $S_a$ is an acceleration scale;

to ensure that response of the designed scale model and the prototype are similar in elastic and elastic-plastic phases, the designed scale model and the prototype are made of a same material that has the structural density scale $S_\rho$ is 1; according to $S_m = S_\rho S_V$, the structural mass scale $S_m$ in equation 1 is replaced by a structural volume scale $S_V$, and design of the scale model A satisfies gravity similarity law, wherein, $S_a$ is 1, then equation 2 is obtained from equation 1:

$$S_k S_l = S_V, \tag{2}$$

in step 1, a process of designing the scale model A using the bending elastic force-gravity similarity law is as follows:

determining a length scale $S_l$ of the columnar marine structure scale model according to a dimension and load limitation of an underwater shaking table, and designing the scale model A according to the calculation equations for the stiffness and volume of the columnar marine structure prototype and model, a process of designing the scale model A according to the calculation equations for the stiffness and volume of the columnar marine structure prototype and model being as follows:

substituting the calculation equations for the structural stiffness and volume of the columnar marine structure prototype and model into Equation 2 to obtain a thickness scale $S_t$, traversing a scale $S_D$ of an outer diameter of the scale model structure from 0 to $S_l$, obtaining a corresponding $S_t$ value according to each $S_D$ value, and selecting a group of $S_D$ values and $S_t$ values based on production difficulty and production efficiency to design the scale model A; and in step 2, an equation of the bending elastic force-gravity similarity law satisfying hydrodynamic force similarity is as follows:

$$S_{F,D} = S_k S_l = S_V, \tag{3}$$

$$S_{F,a} = S_k S_l = S_V, \tag{4}$$

where $S_{F,D}$ is a drag force scale in hydrodynamic force; $S_{F,a}$ is an inertial force scale in hydrodynamic force; equation 3 is based on the premise that the drag force $F_D$ predominates in hydrodynamic force, and equation 4 is based on the premise that an inertial force $F_a$ predominates in hydrodynamic force;

a process of designing the scale model B from the bending elastic force-gravity similarity law satisfying hydrodynamic force similarity is as follows:

determining dimensions of the water-facing surface and the flow direction surface of section of the scale model A according to the principle that the hydrodynamic force scale is consistent with the inertial force scale and the bending elastic force-gravity similarity law, calculating the hydrodynamic force scale of the prototype and model structure using Morison equation, and calculating the stiffness scale $S_k$ and the structural volume scale $S_V$ using the equations for stiffness and volume of the columnar marine structure prototype and model, obtaining a width scale $S_b$ of the flow direction surface and a width scale $S_w$ of the water-facing surface according to relationships between scales of each physical quantity in Equation 3 or 4, wherein if the obtained width scale $S_b$ of the flow direction surface and the width scale $S_w$ of the water-facing surface exceed a predetermined threshold of difficulty to achieve in engineering, it is necessary to change the thickness scale $S_t$ to obtain an $S_b$ and $S_w$ within the threshold; a method for changing the thickness scale $S_t$ is traversing values of $S_t$ from 0 to $S_l$ to obtain corresponding $S_b$ and $S_w$, and selecting a group of $S_w$, $S_t$, and $S_b$ which can be implemented in scale model construction or testing to design the scale model B.

2. The design method for a dynamic scale model satisfying hydrodynamic force similarity and bending elastic force similarity according to claim 1, wherein a process of determining a length scale $S_l$ of the columnar marine structure scale model according to a dimension and load limitation of an underwater shaking table is as follows: taking a value of $S_l$ being equal to a ratio of a maximum dimension at which shaking table surface can hold the scale model to an actual structural dimension of the columnar marine structure prototype, and calculating whether a total mass of the scale model exceeds the load limitation of the shaking table according to the taken value of $S_l$, wherein if the load limitation is not exceeded, the value is taken as the geometric scale for structural design for subsequent design; and if the load limitation is exceeded, the value of $S_l$ is further reduced until the total mass of the scale model is less than the load limitation of the shaking table; and using the value of $S_l$ at this time for subsequent design.

3. The design method for a dynamic scale model satisfying hydrodynamic force similarity and bending elastic force similarity according to claim 1, wherein in step 3, selective laser melting (SLM) or wire arc additive manufacturing (WAAM) is selected according to the manufacturing complexity and precision requirements.

\* \* \* \* \*